Feb. 28, 1967     H. P. DENGLER     3,306,774
FUEL CELL WITH HORIZONTAL ELECTRODES
Filed June 21, 1962     2 Sheets-Sheet 1

HERBERT P. DENGLER    INVENTOR

BY *Alin B. Johnson*

PATENT ATTORNEY

Feb. 28, 1967    H. P. DENGLER    3,306,774
FUEL CELL WITH HORIZONTAL ELECTRODES
Filed June 21, 1962    2 Sheets-Sheet 2
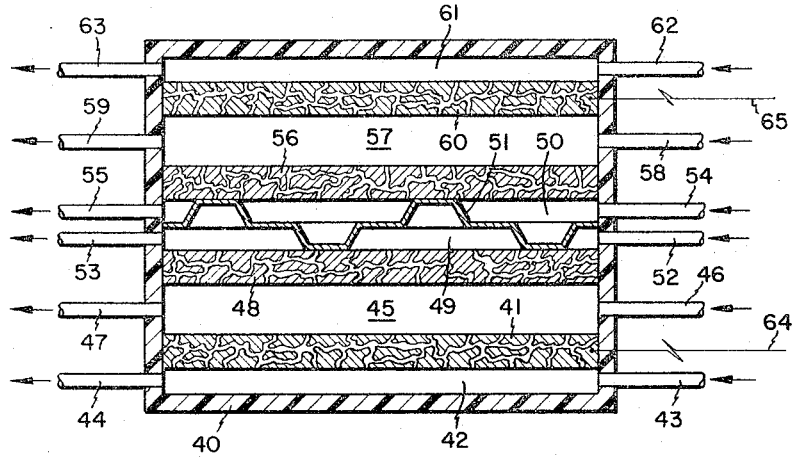
FIGURE 4
FIGURE 5
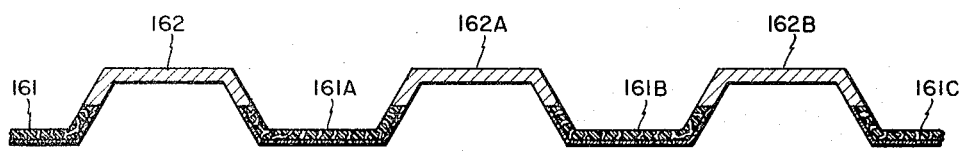
HERBERT P. DENGLER   INVENTOR
BY *Alin B. Johnson*
PATENT ATTORNEY

United States Patent Office 3,306,774
Patented Feb. 28, 1967

3,306,774
FUEL CELL WITH HORIZONTAL ELECTRODES
Herbert P. Dengler, Fair Haven, N.J., assignor to Esso Research and Engineering Company, a corporation of Delaware
Filed June 21, 1962, Ser. No. 204,093
1 Claim. (Cl. 136—86)

This invention relates to new and useful improvements in the direct production of electrical energy from fluid fuels. In particular, this invention relates to improvements in electrochemical conversion of chemical energy to electrical energy in a fuel cell employing an aqueous electrolyte and an organic fuel. More particularly, this invention relates to novel fuel cells employing horizontally positioned electrodes and to novel methods for operating a fuel cell employing such electrodes.

The term "fuel cell" is used herein and in the art to denote a device, system or apparatus wherein chemical energy of a combustible fuel, e.g. hydrogen, carbon monoxide, a hydrocarbon or a substituted hydrocarbon containing hydrogen in its molecular structure, is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode respectively, which are separated by an electrolyte which provides ionic conductance therebetween, conduction means for electrical connection between such anode and cathode external to such electrolyte, means for admitting a fluid fuel into dual contact with the anode and electrolyte and means for admitting a fluid oxidant into dual contact with the cathode and electrolyte. Where necessary or desired, the electrolyte compartment is divided into an anolyte compartment and a catholyte compartment by an ion-permeable partition or ion-exchange membrane. Thus, in each such cell a fuel is oxidized at the anode and an oxidant is reduced at the cathode upon receiving electrons from such cathode.

The fuel cell although potentially the most simple way of converting chemical energy to electrical energy has developed slowly. A number of technical problems remain to be solved before a practical cell suitable for general use is available. These problems relate both to construction and operation of the individual cell and to the assemblage and operation of fuel cell packs or banks where large numbers of cells are connected in series and/or parallel.

The electrochemical reaction of both the anodic and cathodic half cells occur at the interface formed by the electrolyte and the electrode involved. It is well known in the art that the rate of electrochemical reaction in a given half-cell is dependent upon the area of three-way contact established between the reactant, the electrolyte and the electrode. Where a liquid reactant miscible with the electrolyte is employed, the electrode surface exposed to the electrolyte is exposed to the reactant, i.e. fuel or oxidant as the case may be. Where a reactant is either immiscible with the electrolyte or is caused to react in gaseous form the effective area of reaction is limited to a relatively small area on conventional electrodes which are vertically positioned in the cell. This area includes the meniscus formed by an aqueous electrolyte in contacting the electrode and extends a short distance below the electrolyte surface. The effective portion of the electrode in such embodiments is therefore substantially limited to the junction of the electrode and the interface formed by the upper surface of the electrolyte and the air above such surface. With porous electrodes vertically positioned, a problem of preferential wetting is also encountered often leading to electrode flooding by the electrolyte.

In the electrochemical oxidation of hydrogen gas or an organic fuel containing hydrogen in its molecular structure, water is a product of the reaction and the control of the water inventory in an aqueous electrolyte becomes important in a continuous operation presenting problems of electrolyte level and concentration. Where an organic fuel is employed, gas such as carbon dioxide is produced and must be allowed to escape from the cell. Likewise, where the cell is operated to produce oxygenated organic compounds in addition to electrical energy, it is convenient in certain embodiments to remove such products as vapors. Removal of such gases in conventional cells complicates the maintenance of electrolyte level stability.

It is therefore one object of this invention to maximize the effective area of reaction per unit volume of fuel cell by positioning one of the electrodes so that a major portion of the upper surface area of the electrolyte is in essentially parallel relationship with the major longitudinal axis of such electrode.

It is another object of this invention to provide a fuel cell having electrodes in contact with an aqueous electrolyte and positioned in essentially parallel relationship with the upper and lower surfaces of said electrolyte.

It is another object of this invention to provide a fuel cell wherein electrolyte level is automatically controlled through the employment of a floating electrode.

It is another object of this invention to provide eletrodes designed for use in a substantially horizontal position in contact with the upper surface of an aqueous electrolyte which provides means for the escape of gas from the electrolyte while controlling electrolyte level.

It is a further object of this invention to provide cells designed to afford greater slosh control of liquid electrolytes when the cell is mobile.

It is a still further object of this invention to provide novel cell pack arrangements utilizing horizontally positioned electrodes.

Other objects, features and advantages of the invention will be set forth hereinafter, or will be apparent from the description and the drawings, in which are illustrated embodiments of constructions for carrying out the invention.

Reference will now be had to the accompanying drawings.

FIGURE 4 is a schematic side view of an abbreviated fuel cell pack with the horizontally positioned electrodes connected in series by waffle-like bipolar conductors.

FIGURE 5 is an end view of an electrode assembled from alternately porous and nonporous components providing feeding means through the porous components and escape channels formed by the nonporous components for the release of $CO_2$.

Figure 1:
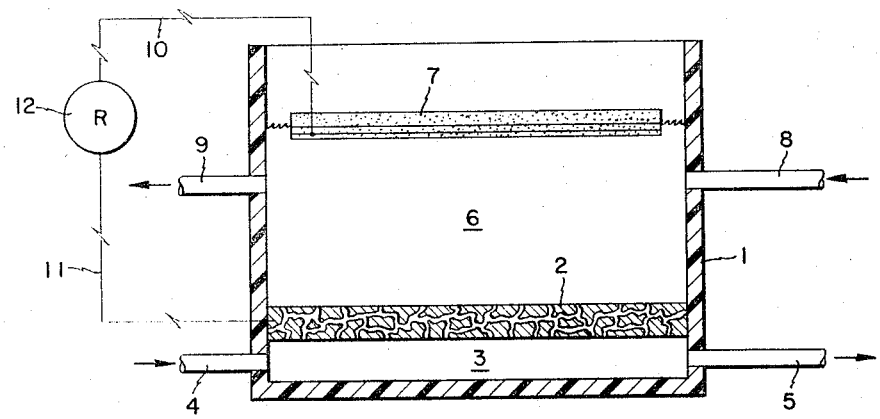
FIGURE 1 is a schematic sectional side view of a fuel cell employing horizontally positioned electrodes wherein one electrode floats upon a liquid electrolyte.

Referring now to FIGURE 1, there is shown a vessel or fuel cell container 1 of suitable nonconductive material, e.g. glass, rubber, etc. Inside vessel 1 is positioned a porous cathode or air electrode 2, e.g. porous carbon impregnated with a suitable metal catalyst, e.g. platinum. Porous electrodes of various structural materials impregnated or coated with various metals or combinations of metals are well known in the art and it is sufficient here to refer to such structure in general terms, this invention not being dependent upon the use of any particular fuel cell catalyst or catalyst base. Below cathode 2 is an oxidant receiving zone 3 which communicates with oxidant inlet conduit 4 and oxidant exhaust conduit 5. When the cell is in operation, air, oxygen gas or other suitable oxidant is passed into oxidant receiving zone 3 via inlet conduit 4 and the escape of such oxidant from exhaust conduit 5 is regulated such that a pressure is built up in zone 3 sufficient to fill the gas pores of cathode 2 and to keep an aqueous electrolyte in electrolyte compartment 6 from flooding cathode 2 or leaking into oxidant compartment 3. Electrolyte compartment 6 is positioned above cathode 2 and is adapted to retain a suitable aqueous electrolyte which may be a solution of either a strong acid or base, e.g. $H_2SO_4$, KOH, etc. Such electrolytes are conventional in this art and need not be discussed further herein. Floating on an aqueous electrolyte in electrolyte compartment 6 is a porous anode 7. Anode 7 is preferably designed to have a specific gravity such that the underside of the anode rides about 0.1 to 5 mm. below the electrolyte surface. The extension of this electrode above the electrolyte surface is limited by the desire to consume space and weight considerations inherent in floating, e.g. 0.1 to 10 mm.

Figure 2:
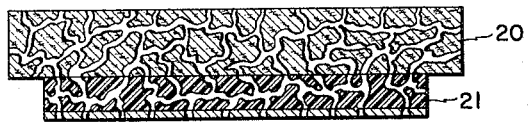
FIGURE 2 is an enlarged schematic end view of one embodiment of the floating electrode of FIGURE 1.

Referring now to FIGURE 2, there is shown an end view of one embodiment of floating anode 7 of FIGURE 1. On a light highly porous structural material 20, e.g. cork, foam rubber, etc. which is chemically resistant to the electrolyte, there is supported a porous organic membrane 21, the surfaces of which have been coated with a thin coating of the desired metal catalyst by means known in the art, e.g. vacuum spraying, reduction of ions in situ, etc. The pores of anode 7 are of suitable size and number to allow unimpeded escape of carbon dioxide formed in the anodic oxidation of an organic fuel. The carbon dioxide thus being formed at the upper level of the electrolyte escapes without the problems attendant to escape through an electrolyte.

Returning now to FIGURE 1, fuel inlet conduit 8 provides means for admitting a liquid organic fuel, e.g. butene-2, into the electrolyte. Where the fuel is miscible with the electrolyte, such fuel will contact anode 7 wherever such electrode is contacted by the electrolyte. Where the fuel is largely immiscible with the electrolyte and floats on the surface, e.g. heptene-2, the anode should be weighted to the degree that the reaction sites on the electrode, i.e. the catalyst impregnated on metal surfaced portion where the supporting structure is nonconductive, are positioned at the fuel-electrolyte interface with some extension above and below such interface. Outlet conduit 9 provides means for evacuating the electrolyte compartment. Conduit 9 may be utilized for removing intermediate reaction products in a stream of electrolyte when the cell is used for chemical production. In such event additional electrolyte is supplied through conduit 8 with the fuel. If the level of the electrolyte in compartment 6 rises or falls the anode here shown moves with the upper surface of the electrolyte. This movement can be utilized to actuate a variety of control mechanisms known in the art to regulate fueling, water addition, etc. Connecting cathode 2 and anode 7 are wires 10 and 11 and resistance means 12 which represents any device or appliance which utilizes direct electric current to perform useful work, e.g. an electric motor. It is to be understood that large numbers of these cells will ordinarily be electrically connected in series and/or parallel.

Figure 3:
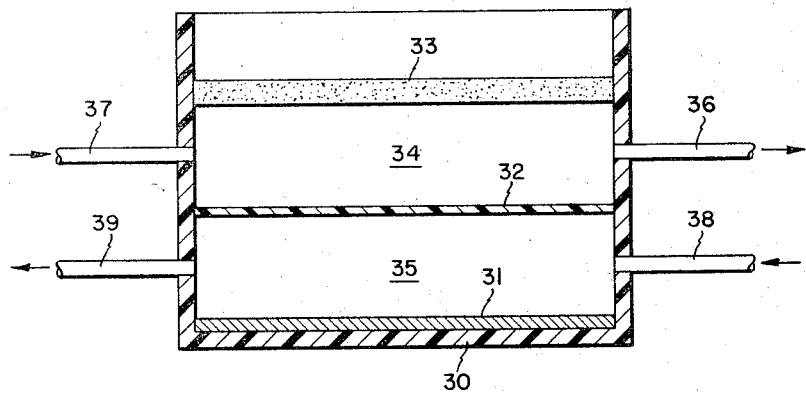
FIGURE 3 is a schematic sectional side view of a fuel cell employing horizontally positioned electrodes in fixed positions with two electrolyte compartments separated by an ion-exchange membrane.

In FIGURE 3 there is shown another embodiment of the invention wherein vessel 30 forms a cell tank for the retention of liquid reactants and electrolyte. Inside vessel 30 is positioned a plate-like metal cathode 31 and a highly porous anode 33. Positioned between the electrodes is an electrolyte partition 32 which divides the electrolyte zone into a catholyte compartment 35 and an anolyte compartment 34. Partition 32 is an ion-exchange membrane or other means known in the art for maintaining ionic conductance between electrodes while preventing or substantially reducing mass migration of fuel from the anolyte into the catholyte or oxidant from the catholyte into the anolyte. Fuel inlet conduit 37 provides means for introducing a fluid fuel to the anolyte.

This embodiment would be best suited for use with a liquid fuel, either soluble or insoluble in the electrolyte, or a gaseous fuel that is readily taken up by the electrolyte. Where a gaseous fuel is largely immiscible with the electrolyte, it is preferable to feed this through either the lower or upper electrodes while providing means for carbon dioxide escape by means other than through the upper electrode. In the embodiment shown, $CO_2$ formed at the upper surface of the electrolyte which is in contact with the anode escapes through the highly porous anode. Anolyte exhaust conduit 36 provides means for removing products from the compartment.

In the catholyte compartment 35 a mineral aqueous acid electrolyte, such as $H_3PO_4$ or $H_2SO_4$, preferably the latter, is employed. The anolyte will ordinarily be of the same acid but may vary in concentration from that used in the catholyte. The catholyte also contains a lesser amount of nitric acid or its equivalent which serves as the primary oxidant, e.g. about 1 to 10 wt. percent $HNO_3$. As the nitric acid is electrochemically reduced at the cathode the reduction products thereof are regenerated by chemical oxidation provided by passing oxygen gas, air, etc. through catholyte compartment 35 via air inlet conduit 38 and oxidant exhaust conduit 39. It is to be understood that all or a part of this regeneration may also be carried on externally by removing reduction products, e.g. NO, effecting regeneration by oxidation with air and recycling the regenerated nitric acid to the catholyte.

In FIGURE 4 there is shown a schematic view of one embodiment of a cell pack employing in series cells of the type hereinbefore described. The exact design may be modified within the scope of this invention. In FIGURE 4 the outer pack housing or vellel 40 contains two cells but in practice this number would ordinarily be increased to a much larger number. In FIGURE 4, cathode 41 of the lower cell is separated from the anode 48 of the lower cell by electrolyte compartment 45. Below porous cathode 41 is an oxidant receiving compartment 42 having means of ingress and egress represented by conduits 43 and 44. Electrolyte compartment 45 is similarly equipped with conduits 46 and 47. Above porous anode 48 is a feeding zone separated into two compartments 49 and 50 by a waffle-like metal conductor 51 which provides electrical contact between the anode 48 of the lower cell and the cathode 56 of the upper cell. Compartment 49 may be utilized solely as a means of escape for carbon dioxide formed at anode 48 in which case fuel is admitted to electrolyte 45 via previously mentioned conduit 46. In the alternative a liquid fuel may be introduced to anode 48 through conduit 52 and compartment 49 and carbon dioxide allowed to escape through conduit 53. Compartment 50 is an oxidant receiving zone for cathode 56 and is equipped with means of ingress and egress via conduits 54 and 55. Above cathode 56 is another electrolyte compartment 57 which is similar in all respects to electrolyte compartment 45 and is equipped with inlet and outlet conduits 58 and 59. Above electrolyte compartment 57 is porous anode 60. Above anode 60 is a compartment 61 which like compartment 49 can be used solely for the escape of carbon dioxide as where fuel is introduced to electrolyte compartment 57 via conduit 58, or may be utilized to admit fuel from conduit 62 to anode 60 with carbon dioxide escaping via conduit 63. Wires 64 and 65 represent terminal leads which when extended meet to complete an electrical circuit.

In FIGURE 5 there is shown an enlarged end view, another embodiment of an electrode for use in contact with the upper surface of an aqueous electrolyte. In this embodiment a "pleated" electrode is formed of porous components 161, 161A, 161B, and 161C, and nonporous components 162, 162A and 162B, respectively. This embodiment of the electrode can be utilized to feed a gaseous fuel such as ethane where the fuel electrode is above the electrolyte. In this embodiment the fuel is passed through the porous sections 161 et al. at a pressure just sufficient to reach the electrolyte below. Electrolyte level is maintained at approximately the junction level of components 161 and 162. The space between the electrolyte and the nonporous components 162 et al. fills with carbon dioxide and escapes laterally from the system.

In the embodiment employing a floating electrode, control of electrolyte level can be achieved in a number of ways by conventional switching means connected to the floating electrode and the fuel, oxidant supply or circulating coolant where employed. Thus, for example, when the water inventory becomes too high, the water producing fuel to the flooded cell may be closed off without affecting the flow to other cells. The excess water can then be removed by evaporation and the system returned to balance. Oxidant and coolant can be similarly regulated. When the water level falls, lowering this electrode, the connection may be adapted to release more fuel to the cell or change the rate of coolant flow.

When the upper electrode of the cell is fixed in position, control of electrolyte level can still be maintained. When the level falls enough to be out of the contact with the upper electrode the reaction ceases. Where the upper electrode is fixed in position and the water inventory becomes excessive the cell can be utilized to permit the upper surface of the electrolyte to trigger a control mechanism when a predetermined level is reached.

Other modifications can be effected without substantially departing from the scope of the invention.

What is claimed is:

In a fuel cell comprising an electrolyte compartment adapted to retain an aqueous electrolyte, an anode and a cathode spaced apart and communicating with said compartment so as to be in contact with said electrolyte when said compartment is partially charged therewith, conduction means establishing electrical connection between said anode and said cathode external to said electrolyte, fueling means for passing an electrolyte immiscible normally liquid organic fuel into dual contact with said anode and said electrolyte, and oxidant transfer means for passing a fluid oxidant selected from the group consisting of air and gaseous oxygen into dual contact with said cathode and said electrolyte, the improvement in combination therewith wherein said anode contains pores of suitable size and number to allow substantially unimpeded escape of carbon dioxide formed during the anodic oxidation of said fuel and said porous anode is located in said electrolyte compartment such that said porous anode floats at the interface existing between said aqueous electrolyte and said immiscible fuel so that said anode's upper surface extends above the upper level of the electrolyte-fuel mixture thereby allowing said carbon dioxide formed during said anodic oxidation to escape from said porous anode into the upper portion of said electrolyte chamber, said portion being substantially free of electrolyte and fuel.

References Cited by the Examiner

UNITED STATES PATENTS

| 2,925,454 | 2/1960 | Justi et al. | 136—86 |
| 2,925,455 | 2/1960 | Eidensohn et al. | 136—86 |
| 2,980,749 | 4/1961 | Broers | 136—86 |
| 3,002,039 | 9/1961 | Bacon | 136—86 |
| 3,012,086 | 12/1961 | Vahldieck | 136—86 |

OTHER REFERENCES

How To Make a Demonstration Fuel Cell, Esso Research and Eng. Co., P.O. Box 45, Luden, New Jersey.

WINSTON A. DOUGLAS, *Primary Examiner.*

JOHN R. SPECK, ALLEN B. CURTIS, *Examiners.*

H. FEELEY, *Assistant Examiner.*